(12) United States Patent
Parmar et al.

(10) Patent No.: US 8,934,866 B2
(45) Date of Patent: Jan. 13, 2015

(54) SYSTEM TO ASSIST A MOBILE DEVICE SUBSCRIBER TO PERFORM SELF-DIAGNOSIS OF THE MOBILE DEVICE

(75) Inventors: Ramesh Parmar, Scotch Plains, NJ (US); Deepak Gonsalves, Avenel, NJ (US); Deepa Jagannatha, Somerset, NJ (US); Subramanyam Ayyalasomayajula, Kendall Park, NJ (US)

(73) Assignee: AetherPal Inc., South Plainfield, NJ (US)

( * ) Notice: Subject to any disclaimer, the term of this patent is extended or adjusted under 35 U.S.C. 154(b) by 211 days.

(21) Appl. No.: 13/464,038

(22) Filed: May 4, 2012

(65) Prior Publication Data
US 2012/0282899 A1 Nov. 8, 2012

Related U.S. Application Data

(60) Provisional application No. 61/483,293, filed on May 6, 2011.

(51) Int. Cl.
| H04W 24/00 | (2009.01) |
| H04W 24/02 | (2009.01) |
| H04W 4/00 | (2009.01) |
| H04L 29/08 | (2006.01) |
| H04W 88/02 | (2009.01) |

(52) U.S. Cl.
CPC ............... *H04W 24/02* (2013.01); *H04W 4/001* (2013.01); *H04L 67/125* (2013.01); *H04W 88/02* (2013.01)
USPC ............................. 455/411; 455/419; 709/227

(58) Field of Classification Search
USPC ........... 455/411, 414.1–414.4, 419–420, 410; 709/227; 345/173
See application file for complete search history.

(56) References Cited

U.S. PATENT DOCUMENTS

| 8,543,659 | B2 * | 9/2013 | Pica et al. .................... 709/217 |
| 2006/0217152 | A1 * | 9/2006 | Fok et al. ...................... 455/557 |
| 2006/0234698 | A1 * | 10/2006 | Fok et al. ...................... 455/425 |
| 2006/0259629 | A1 * | 11/2006 | Usmani et al. ................ 709/227 |
| 2007/0044042 | A1 * | 2/2007 | Jones et al. ................... 715/961 |
| 2007/0135949 | A1 * | 6/2007 | Snover et al. .................. 700/86 |
| 2010/0062724 | A1 * | 3/2010 | Fok et al. ................... 455/67.11 |
| 2010/0218012 | A1 * | 8/2010 | Joseph et al. ................. 713/310 |
| 2011/0307601 | A1 * | 12/2011 | Hogan et al. .................. 709/224 |
| 2012/0023592 | A1 * | 1/2012 | Wilson ............................ 726/28 |
| 2012/0035904 | A1 * | 2/2012 | Seckendorf et al. ............ 703/21 |
| 2012/0041638 | A1 * | 2/2012 | Johnson et al. .............. 701/33.1 |
| 2012/0179939 | A1 * | 7/2012 | Collins, Jr. ..................... 714/57 |
| 2012/0331421 | A1 * | 12/2012 | Mohammed et al. ......... 715/841 |
| 2013/0080833 | A1 * | 3/2013 | Sugaya ........................... 714/32 |

* cited by examiner

*Primary Examiner* — Khawar Iqbal
(74) *Attorney, Agent, or Firm* — Volpe and Koenig, P.C.

(57) ABSTRACT

The instant invention is a process for a Self-Care system that allows mobile device subscribers to manage their own devices without making a trip or a phone call to the customer care center. Subscribers can view service issues and repair and update settings, check the status of their devices, and manage device security minimizing customer service calls. Dynamic workflow navigates the subscriber to easily find a solution to their problem which will substantially reduce frequent calls to customer care. Dynamic menus avoid the unnecessary information that the subscriber might enter about the device and leads the subscriber towards the path of solving the issue. The system is scalable to include diagnostics tools as part of self-care and customer care, where the subscribers can benefit from these tools to reset their device to a normal state.

16 Claims, 8 Drawing Sheets

SYSTEM TO ASSIST A MOBILE DEVICE SUBSCRIBER TO PERFORM SELF-DIAGNOSIS OF THE MOBILE DEVICE

CROSS REFERENCE TO RELATED APPLICATIONS

The present application is based upon U.S. Provisional Patent Application Ser. No. 61/483,293 filed May 6, 2011 and is related to U.S. application Ser. No. 12/426,555 filed Apr. 20, 2009 and entitled Virtual Mobile and AD/Alert management for Mobile Devices, the contents of the applications are incorporated herein by reference.

FIELD OF INVENTION

The present invention relates to mobile wireless communication devices, systems, networks, and methods of operation. This invention describes the process of Self-Care for mobile devices through a dynamic workflow management system.

BACKGROUND OF THE INVENTION

Remote management of devices and applications is now extremely important in controlling costs in mobile service operations. Automatic updates to applications, drivers, network, and device configuration can save a significant amount of time and cost in decreasing the no-fault found device returns.

Customer Care representatives can send emails or SMS to the device and query the status of the device but there is no built-in remote diagnostics capability. As a result, if the device fails to perform a task it becomes difficult to get it working again until the root cause is known. Delays in getting or entering information often result in delays to business processes that lead to an inferior customer experience. Mobility empowers workers with access to information at the point of customer contact, helping them to answer questions, resolve issues, or input orders on the spot.

What is needed in the art is a system that will help a subscriber self-diagnose and manage their mobile device without making a trip or a phone call to the customer care center or login to a customer care portal.

SUMMARY OF THE INVENTION

The instant invention sets forth a Self-Care system that allows subscribers to self-diagnose and manage their mobile device without making a trip or a phone call to the customer care center or login to the customer care portal. Based on mobile device capabilities, subscribers can view service issues and repair and update settings, check the status of their devices, and manage device security minimizing customer service calls. The framework provides flexibility to update the workflow periodically.

Thus, an objective of the invention is to provide a dynamic workflow that navigates a subscriber to easily find a solution to their problem which will substantially reduce frequent calls to customer care.

Another objective of the invention is to provide a scalable system to include diagnostics tools as part of self-care and customer care, where the subscribers can benefit from these tools to reset their device to a normal state.

Still another objective of the invention is to provide a dynamic workflow menu for Self Care to help subscribers proactively self-diagnose their devices faster and more economically, than was possible in the past.

Yet another objective of the invention is to provide a Self-Care tool available on the device helps the subscriber to avoid going to the customer care portal every time thereby reducing the amount of time the subscriber has to spend on the web.

An advantage of the system is to provide a flexible framework to update the workflow periodically. Dynamic workflow navigates the subscribers to easily find a solution to their problem, which will substantially reduce frequent calls to customer care. The system is scalable to include diagnostic tools as part of self-care and customer care, where the subscribers can benefit from these tools to reset their device to a normal state.

The invention provides a dynamic workflow menu for self care to help subscribers proactively self-diagnose their devices faster and more economically, than was possible in the past.

The invention provides a self-care tool on the device that helps the subscriber to avoid going to the customer care portal every time, thereby reducing the amount of time the subscriber has to spend on the web.

The invention provides dynamic menus that avoid the unnecessary information that the subscriber might enter about the device and instead leads the subscriber towards the path of solving the issue.

The invention provides a self-care tool can help the subscriber to perform health checks on the device locally without need for a customer care representative, in just one-click.

The invention provides dynamic workflows that can be easily created and managed by the Administrators.

The invention provides periodic updates to workflow and diagnostic tools as part of self-care and customer care, where the subscribers can benefit from these tools to reset their device to a normal state.

The invention provides a dynamic workflow that allows a subscriber to find a solution to their problem.

The invention substantially reduces the frequent calls currently received through customer care.

The invention provides a remote diagnostics capability so if the device fails the subscriber can perform a remote wipe of applications and data.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
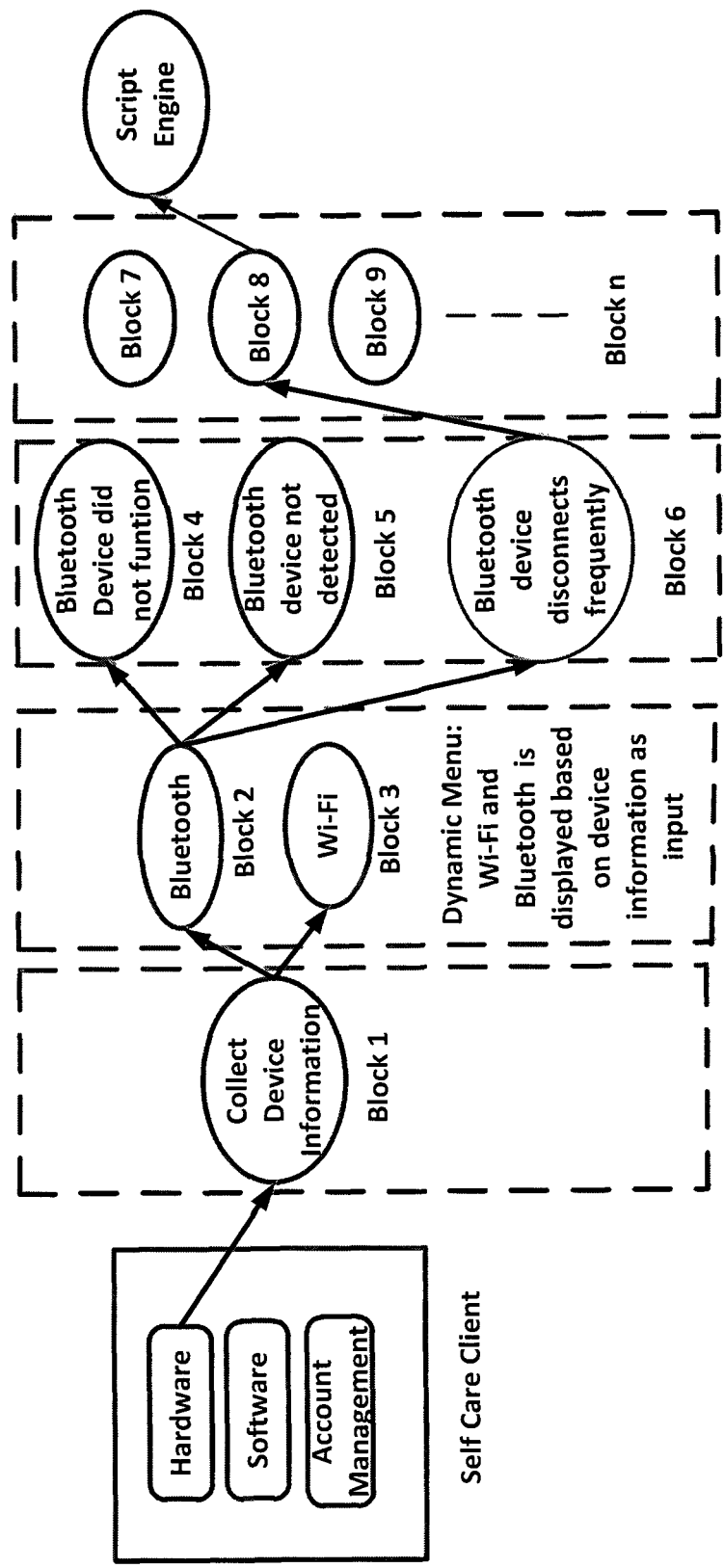
FIG. 1 is a flow diagram of a dynamic call flow for self care diagnostics.

Referring now to FIG. 1, the instant invention uses a client server model which communicates using a proprietary protocol. The client residing on the device helps the subscriber to login to the Self-Care system that remotely interacts with the server allowing the subscribers to self-diagnose their devices. Based on the selection made from the menu, the subscriber is guided through a series of choices that leads to the specific problem. The current invention focuses on the process of managing the dynamic information workflow for Self-Care, since the workflows and policies that need to be enforced for Self-Care differs depending on the sensitivity of information managed.

Dynamic workflow navigates the subscribers to easily find a solution to their problem which will substantially reduce frequent calls to customer care. The system is scalable to include diagnostic tools as part of self-care and customer care, where the subscribers can benefit from these tools to reset their device to a normal state. The framework provides flexibility to update and manage the workflow as needed.

The workflows and policies that need to be enforced for Self-Care differs depending on the sensitivity of information managed. Hence the current invention focuses on the process of managing the dynamic information workflow for Self-Care.

Figure 2:
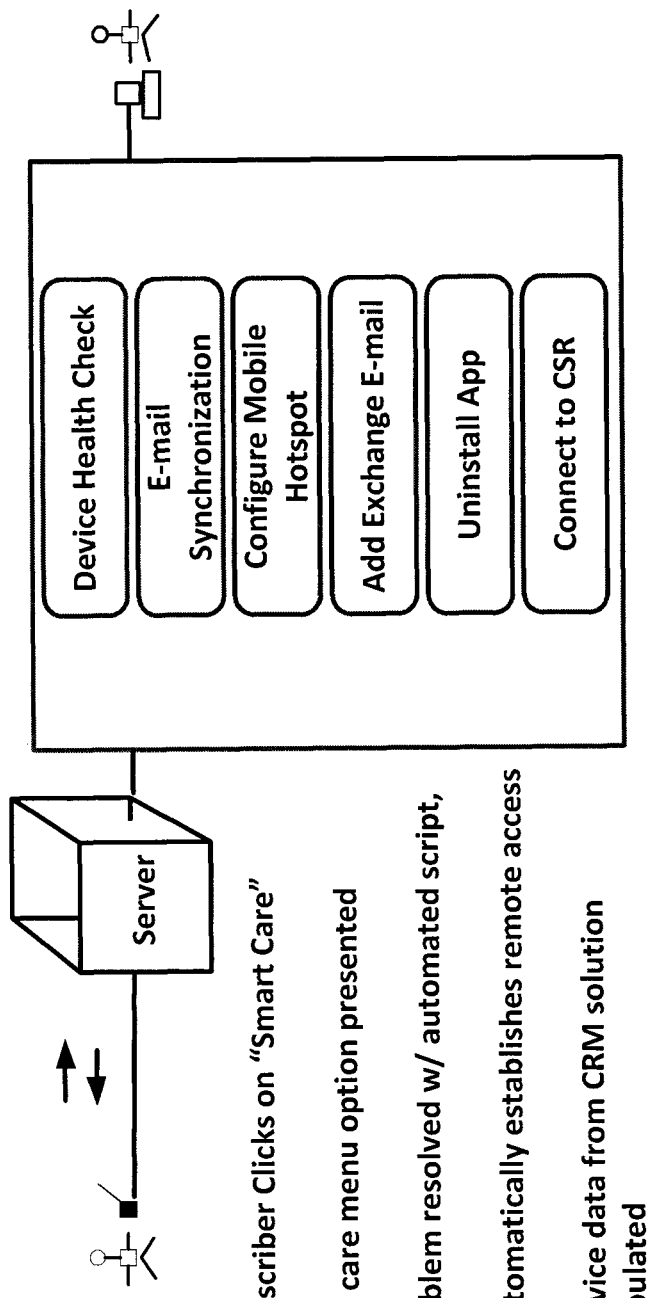
FIG. 2 is a flow diagram of a client server model.
Figure 3:
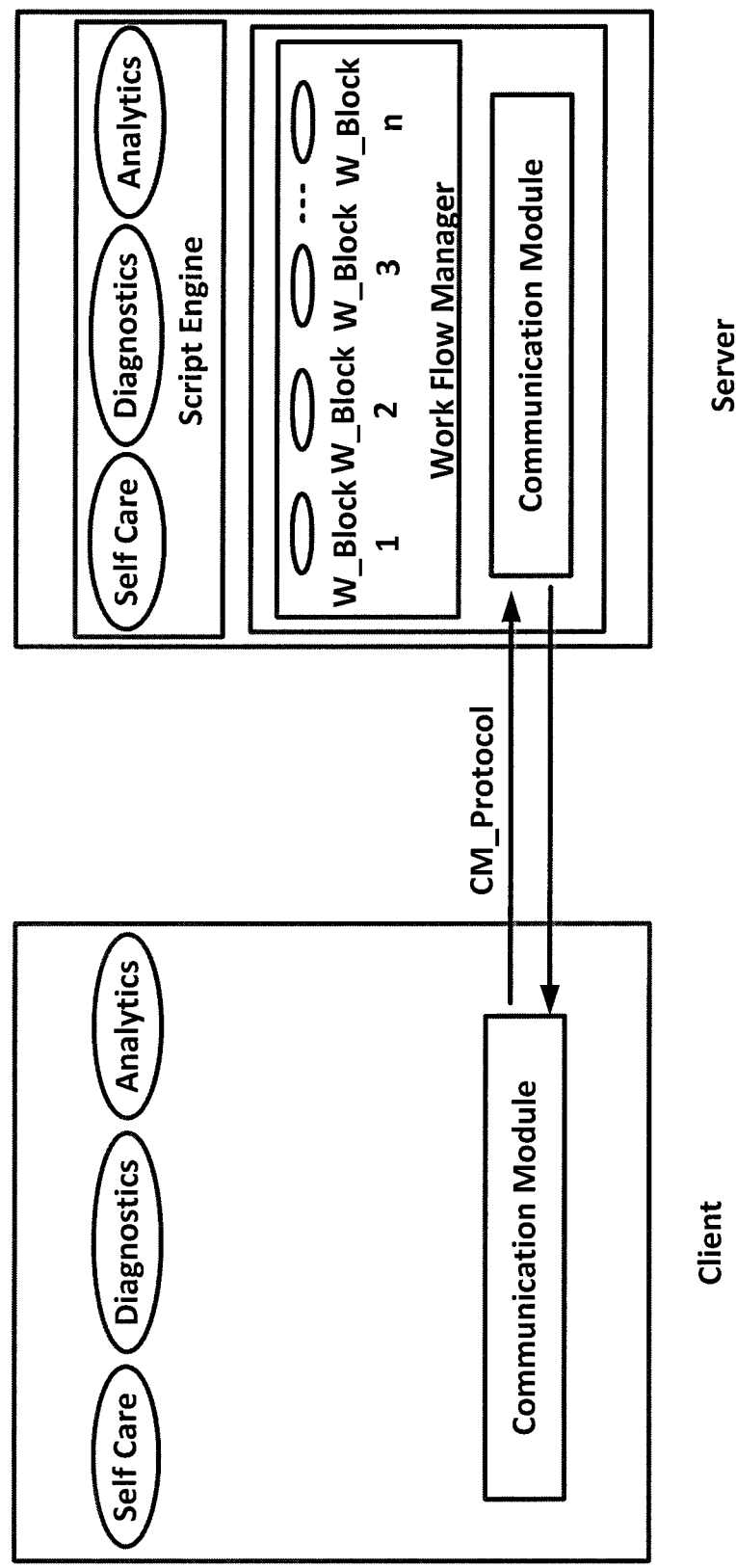
FIG. 3 is a flow diagram of a model illustrating the mobile device and the server module controlling the mobile device by performing various operations as per the workflow.

Referring to FIG. 2, set forth is an example of wherein a subscriber has a hardware problem on a mobile device. The following sets for the dynamic call flow for Self-Care:

Step 1: Subscriber detects that there is a hardware (Bluetooth) issue on the phone;

Step 2: Subscriber opens the Self-Care menu application on the device;

Step 3: Menu shows three options for the subscriber to choose;

Step 4: Subscriber chooses "Hardware button" on the menu;

Step 5: Once the hardware option is chosen the server will dynamically provide options for the subscriber to choose based on the features that the device supports;

Step 6: Finally once the subscriber chooses the right option the script is pushed on to the device to troubleshoot the problem;

Referring to FIG. 3, the current invention allows for a client server model for Self-Care device management. The system is scalable to support functionalities like diagnostics and Analytics as part of subscriber care solution. The model consists of a client application on the device and the server module controlling the device by performing various operations as per the workflow.

Self-Care is used by device owners to manage their own devices. The device owner manages the device by using a graphical user interface (GUI) on the client. Self-Care operates in the context of a single device. The owner logs into the application and can manage only their device. If the owner has more than one device, a device is selected from a list.

Scripting Engine serves as a database and execution engine for collection of scripts under Self-Care, Customer Care, Diagnostics and Analytics. Scripts allows Admin to write (and share) simple scripts to automate a wide variety of device management tasks to meet custom needs.

Workflow ManagerWorkflow Manager is a computer system that manages and defines a series of tasks to produce a final outcome or outcomes including; collection of WorkFlowBlocks; each block consists of collection of scripts; each script is a collection of "cmdlets"; and the scripts will be executed by the Scripting Engine.

Communication Module is responsible for establishing a session between the server and the client using proprietary communication protocol.

Self-Care menu on client; UI will have dynamic content based on the type of device and also how the System Administrator wants to provide access to the subscriber. Based on the item the subscriber chooses, the menu on the device will pull the information from the WorkFlowManager on the server and displays information accordingly.

The following are some of the commands/actions that would be performed by the self-diagnosis client:

Commands:

Execute GET/SET/EXEC commands

Query information from a particular node

Write information to a particular node

Process or Execute a particular command
   Option for scheduling

Start/Stop Capture/Monitor statistics/metrics on the device
   Data session, RF metrics, mobility management L3 messages Turn ON/OFF Logging Turn ON/OFF Reporting Clear Buffer/Storage on the phone
   After the server receives the report on the script executed with sufficient logs the phone buffer can be cleared to free its memory since the report is already stored in the server Send Status report Replace Actions:

Poll status report for every command that was sent by the server

Ability to turn ON/OFF the monitoring capabilities locally

Ability to access the Mobility Management (Layer3) messages/timers

Store a string of commands to execute them at a later period (Scheduled operation)

Ability to terminate a script for time sensitive operations when there isn't enough battery level to execute Determine which network the device is latched ON to perform time sensitive operation (Ex: LTE/WCDMA/CDMA/GSM/GPRS/EVDO/eHRPD)

Post all the information regarding the status of the script executed like time, date, result, etc.

Provide an Interactive menu for Self-Care

Figure 4:
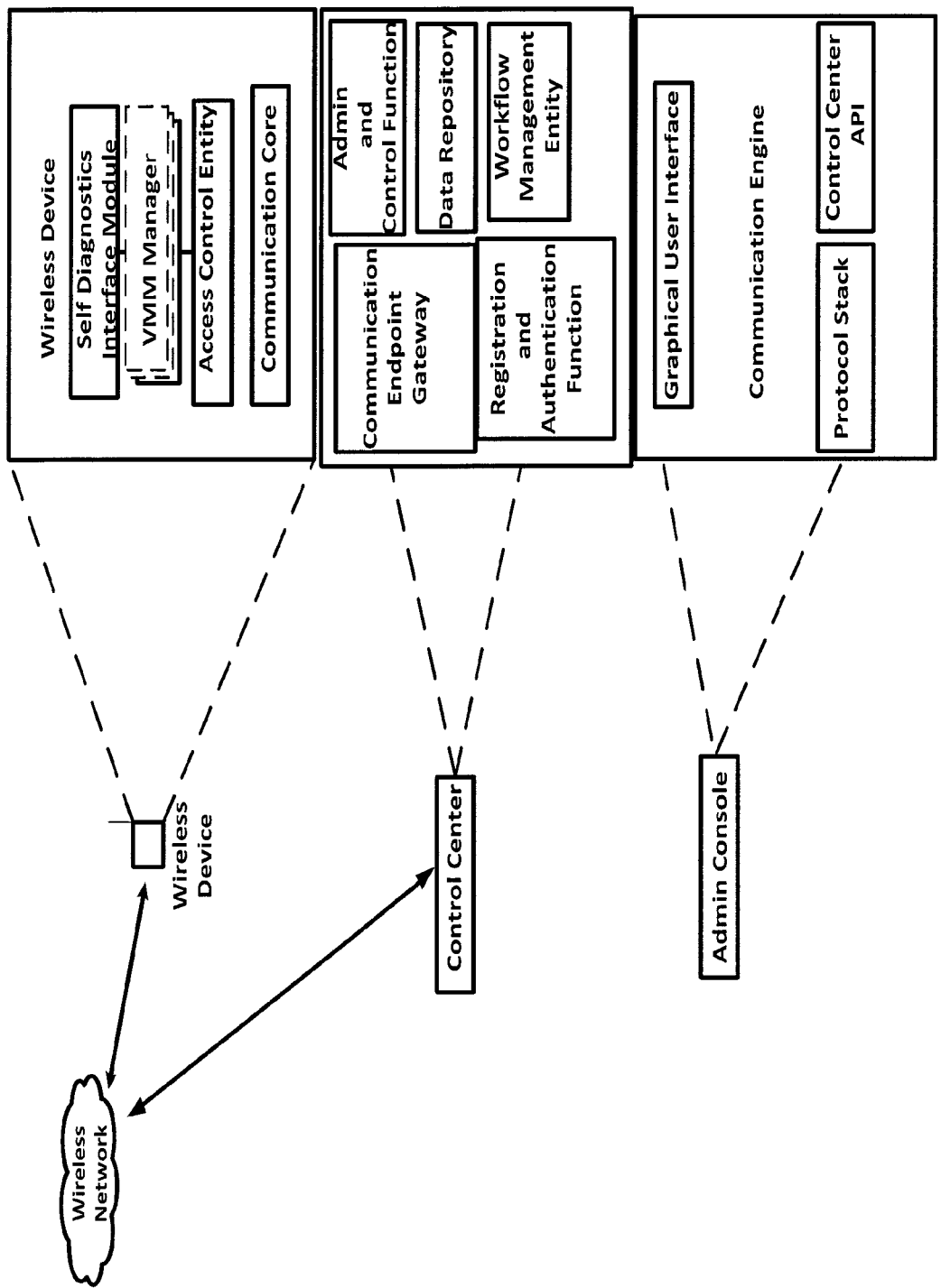
FIG. 4 is an illustration of the Control Center System components.

Provide access to the following
   Application usage data when they start, stop, crash how long was it used
   browser usage data when they start, stop, crash how long was it used
   PPP stack on the phone
   SMS/MMS/Email storage
   NAM, PRL, SW ver/HW ver, Memory, processor occupancy, etc on the phone
   Geoposition Information—access to LAT LONG
   Missed Call/Dropped call statistics Referring to FIG. 4, the key components of the system include:

Admin Console where care agents interacts with the device through the Control Center system.

Control Center System, which is responsible for the data management, device management, web services, analytics, security management and administrative services and device connectivity.

Device client which executes within a wireless device.

The Control Center System components:

Communication End Point Gateway

Admin and Control Function

Data Repository

Workflow Management Entity

Registration and Authentication Function

Communication End Point Gateway (CEG): The primary responsibility of the Communication End Point Gateway is to manage the device connections within the system. The following are the key functions:

The server provides communication endpoints between Control Center (Technician Console, Admin and Control Function) and the device;

Allows for multiple requests to be serviced within one session from multiple consoles;

Provides a consistent manner of device connection and tool service in a system with heterogeneous devices running different operating systems;

Provides load balancing across multiple Connection Handlers on each Communication End Point Gateway Server in order to minimize single point of failure.

Figure 5:
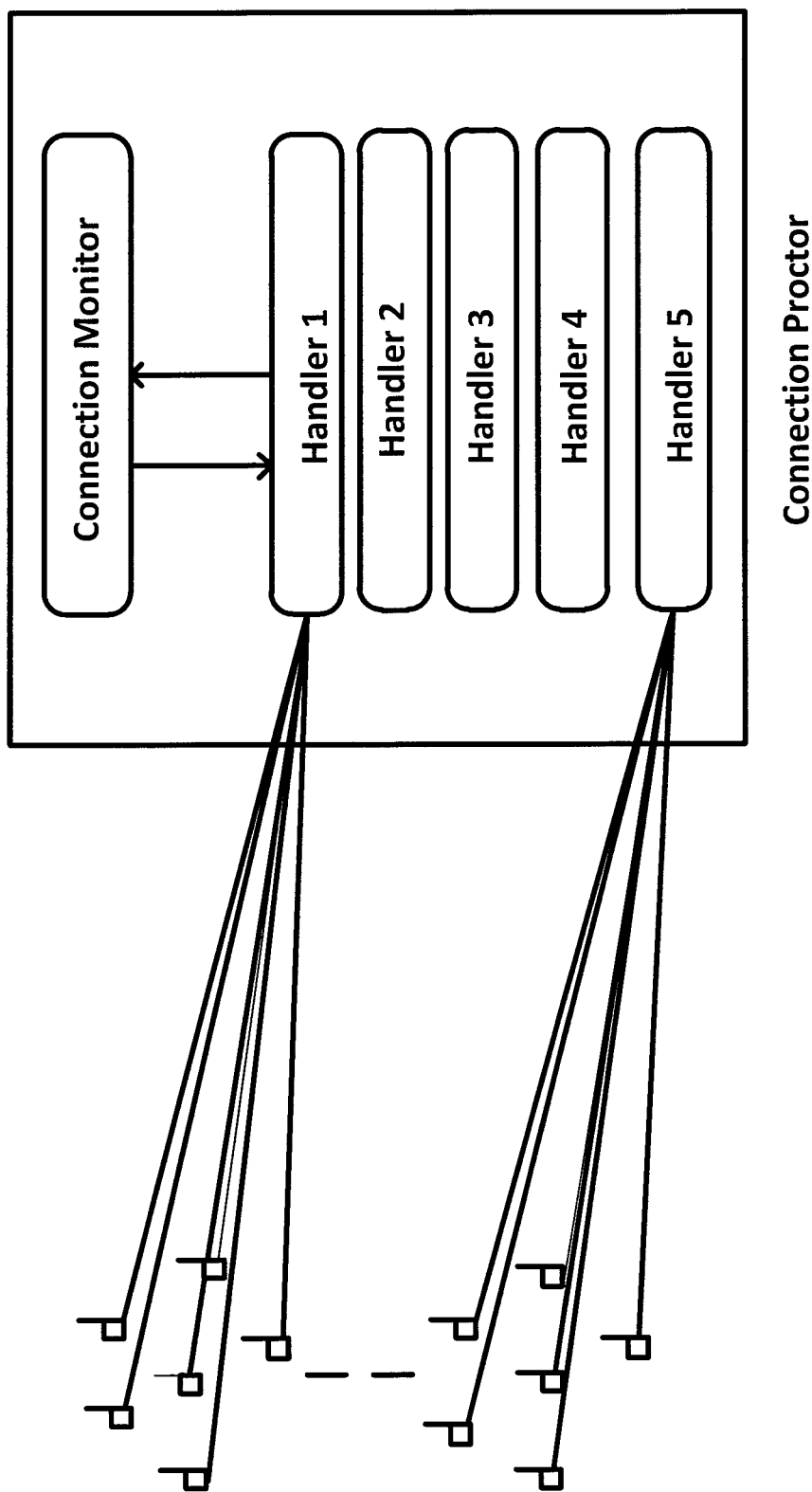
FIG. 5 is an illustration of the End Point Gateway server components.

Referring to FIG. 5, the connection End Point Gateway server is comprised of two components:

Connection Monitor
  Creates and manages Connection Handlers.
  Creates Session ID for new connection request.
  Monitors all the scheduled and existing sessions.
Connection Handler
  By default, Connection Handler is setup for every Connection Proctor, where the number of Connection Handlers is configurable.
  All the sessions are load distributed across the Connection Handler.
  Each handler handles multiple device sessions.

Admin and Control Function: Primary responsibility is to administer and manage all types of communication between the Control Center and the client devices.

Administrative Service: The Administrative Service is designed to be the central administration entity of the entire VMM-RC system. Through this service, system administrators perform administration, management and instrumentation of all the servers within the system, create and maintain multiple tenants, assign tenant administrator roles, etc.

Management Service: Management Service provides the operational end point to the system. The primary functions of Management Service are:
  Load distribution among the CEG
  Management of device registration
  Administration of devices
  Administration of subscribers, zones, policies, roles, etc.
  Session Queuing Management Entity: This component is responsible in providing the Management service with an in-memory data store for key operational data such as ACL, user/group/zone structures, etc.

Service Coordinator: The Service Coordinator is responsible in coordinating the communication between various elements within the System. It provides the database interface to the Registration and Authentication Function in the Control Center. All services register themselves with this service. This service is responsible for service discovery.

Workflow Management Entity: The workflow management entity is responsible for the management and execution of workflows on behalf of the devices.

Data Repository: This stores all the information about the VMM-RC Mobile devices, server configuration, tasks and status settings. These databases are pivotal to configure and update managed devices and server components. It is also responsible to maintain the user login information as well as device authentication information.

The system comprises of 3 database elements:

Admin DB: The Admin DB maintains all the system configurations, tenant configuration and management information, system administration and server instrumentation data. This database is accessed by the AetherPal System Admin Service.

Ops DB: The Ops DB maintains data that is required for the operations of the system such as device enrollment, Access Control List (ACL), groups, users, zones, etc. This database is accessed by the AetherPal Management Service and the Service Coordinator.

Reports DB: The Reports DB contains historical data of device enrollment, session, audit, report views, etc.

Registration and Authentication Function: This component provides a single point of entry for all devices for enrollment and authentication services during VMM-RC session. Registration and Authentication function comprises of the following components:

Registration Service: During Auto-Enrollment, devices are required to register themselves with this service, prior to enrolling themselves.

Enrollment Service: This service is responsible to enroll registered devices with the system. Enrollment process is defined in detail in the later sections of the document.

Software Update: This service manages the various client packages in the system. Devices connect to this service to request for client update. If an update is available, the service will provide the appropriate client download link.

Device Management: This service provides the enrolled devices an interface to update its parameters in the system such as MDN when the device detects a change.

Anchor Admin: This service provides the administration component.

The Technician Console provides a graphical user interface to manage and control the Mobile Devices. The following provides list of functions that can be performed using the console:

Begin pre-enrollment requests

Manage all RD Mobile devices

Service the infrastructure of the Control center

Perform administrative tasks, VMM-RC

Device Client consists of the following components:

Self-Diagnosis Interface Module

VMM Manager

Access Control Entity

Communication Core

Figure 6:
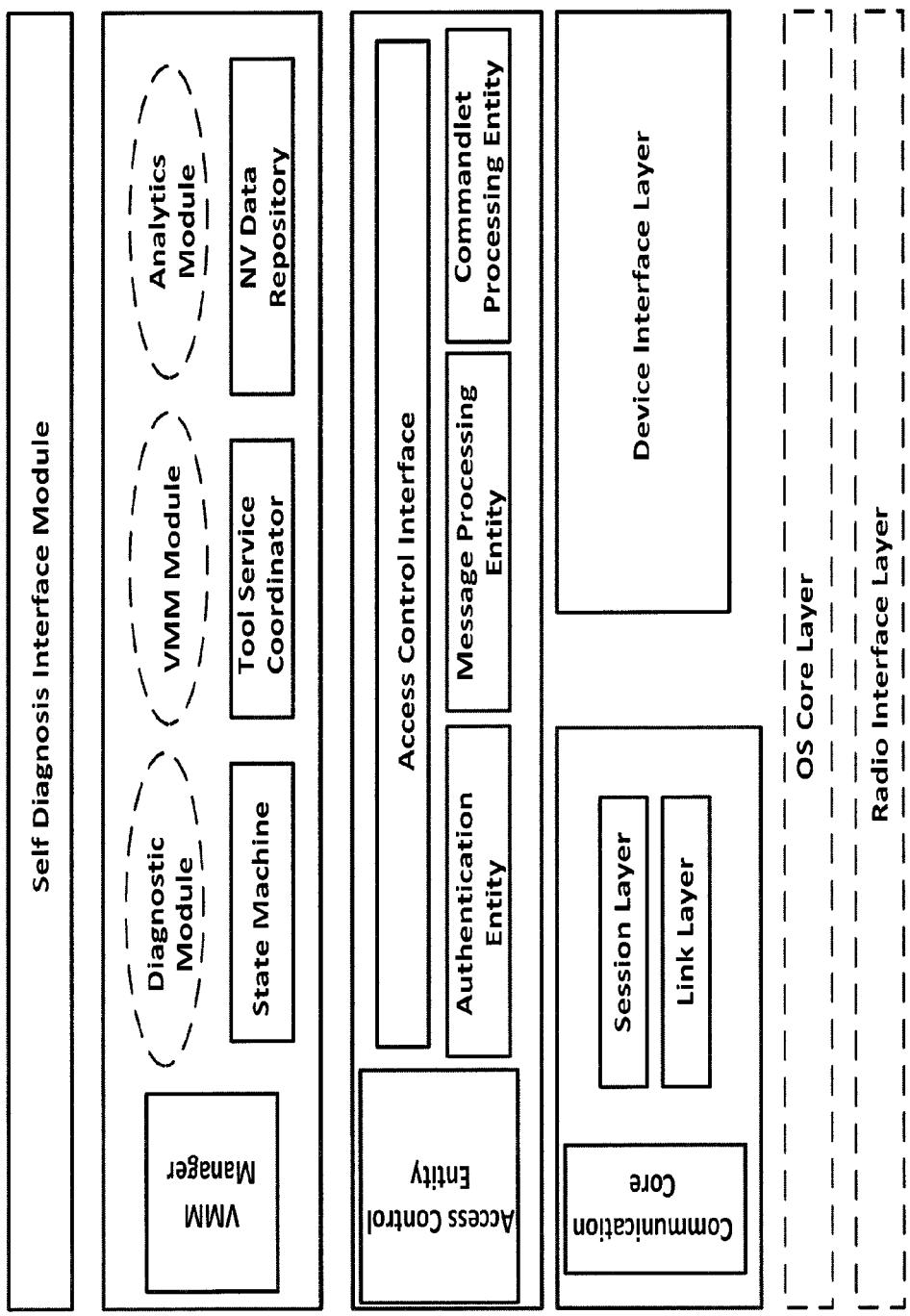
FIG. 6 is an illustration of the self-Diagnosis Interface Module.

Referring to FIG. 6, the Self-Diagnosis Interface Module provides a consistent and standard Application Programming Interface or API to the User Interface. The Self-Diagnosis Interface module exposes synchronous as well as asynchronous function calls, by which the User Interface interacts with the application stack. It also provides a callback mechanism to the Self-Diagnosis user interface for asynchronous communication.

VMM Manager includes the following: VMM Modules: VMM modules provide a multitude of tool services. Tool Services are grouped together that exhibit common functionality such as Remote Control, File Manager, Device Management, Diagnostics, etc.

State Machine: Each tool service maintains an instance of the state machine. A State Machine defines a set of shared states that the tool service on the device application shares with the server.

Tool Service Coordinator: The Tool Service Coordinator maintains a collection of active tool service instances that are currently being serviced by the VMM application. This entity maintains the lifetime of all Tool Services, and is responsible in creating and destroying Tool Services.

NV Data Repository: Authentication and authorization specific data that is shared between the VMM application and the server is maintained within the NV data repository. This data repository also serves the purpose of maintaining Tool Service configuration as well as VMM configuration data.

Access Control Entity: Access Control Entity layer provides a set of functions to the Tool Services to communicate with the Control Center. It provides in the encapsulation of messages before forwarding it to the Communication Core. This layer is responsible to invoke an instance of the Communication Core layer and provides a state machine that defines the state of the VMM application.

Access Control Interface: Access Control Interface provides a set of standard Application Programmer Interface or API to the Tool Services. These APIs provide a consistent communication platform to facilitate both synchronous as well as asynchronous communication.

State Machine: The ACI State Machine identifies the overall state of the VMM application. State transitions within the ACE State Machine triggers events that are handled by the VMM layer. The states are Open and Closed. Traffic flows through the ACI layer only in the Open State.

Authentication Entity: The authentication Entity is responsible in ensuring that the device receives connection and processes requests from the server with which it is enrolled. This entity ensures data integrity, security and authentication.

Figure 7:
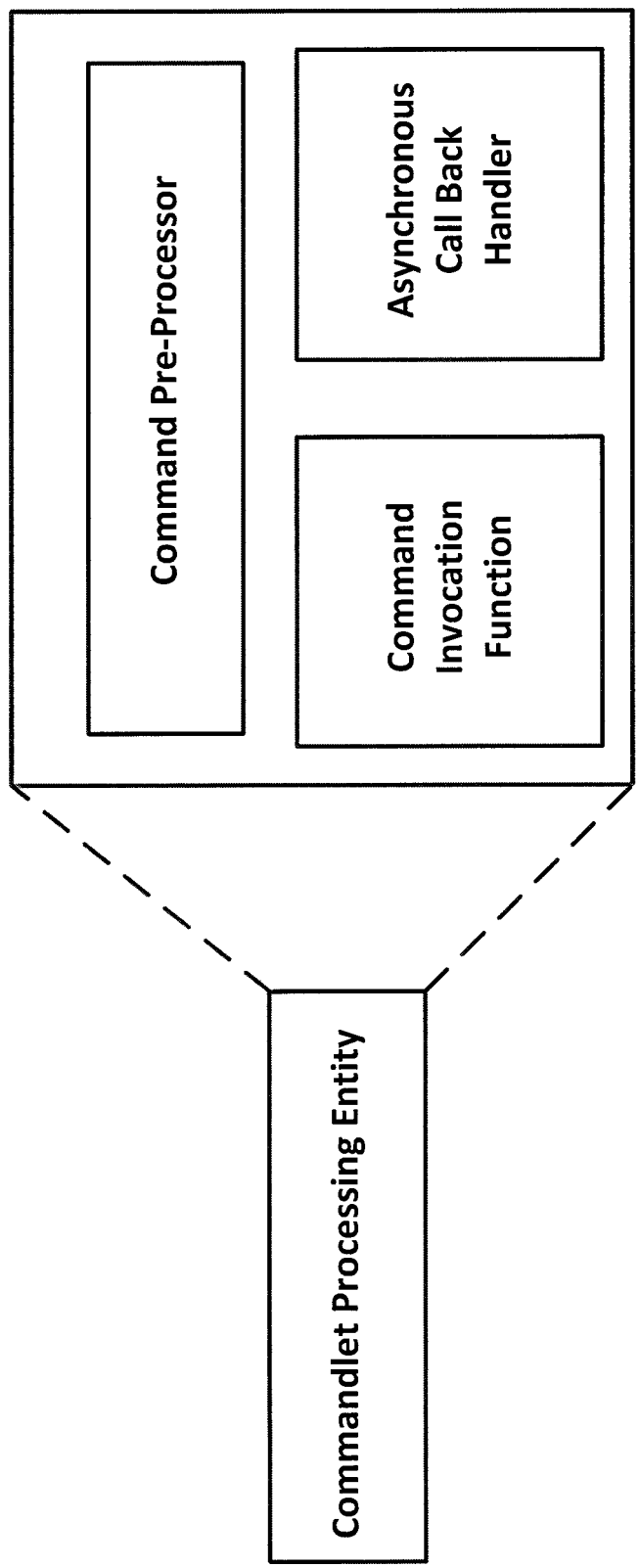
FIG. 7 is an illustration of the CommandLet processing entity.

CommandLet Processing Entity: Referring to FIG. 7, the CommandLet processing entity executes individual cmdlets or atomic commands on behalf of the server. The commands are pre-processed, and passed onto the command invocation function which is responsible in translating the abstract cmdlet into a device specific command.

Commands could be executed synchronously or asynchronously. Asynchronous commands take longer time to execute. Hence the Asynchronous Callback handler provides a mechanism to trap and route the execution of asynchronous commands.

Figure 8:
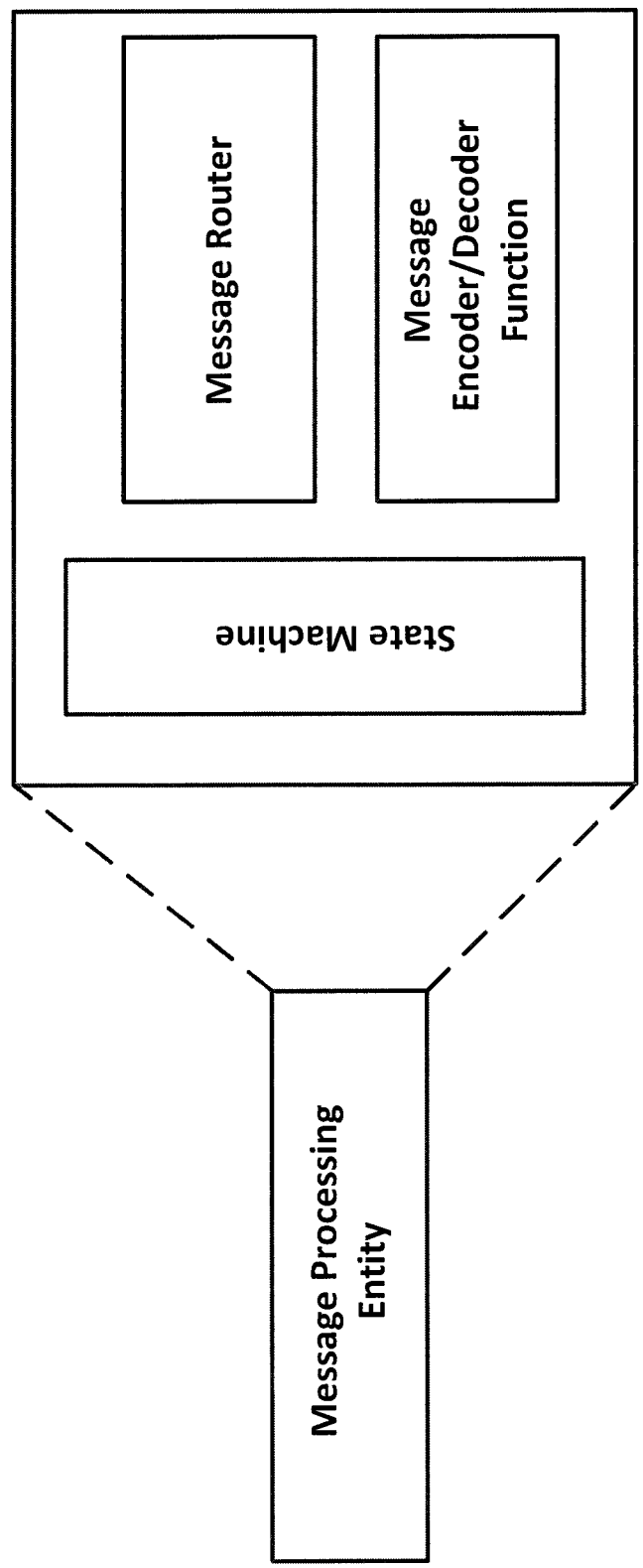
FIG. 8 is an illustration of the Message Processing Function.

Message Processing Entity: Referring to FIG. 8, set for is the Message Processing Function is a signal message preprocessor. This entity receives signal messages from the Session Layer destined towards Tool Services. It de-frames these messages prior to forwarding it to the Message Routing Entity to apply routing rules. Messages that are destined to the server from Tool Services are encapsulated here.

Communication Core: The Communication Core Layer is responsible to setup and maintain a dedicated communication channel with the Control Center. This layer provides the necessary framework to transport messages between the upper layers and the Control Center. It provides message encapsulation, framing, fragmentation and packet re-construction of Tool Service messages.

While detailed embodiments of the instant invention are disclosed herein, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the technology to variously employ the present invention in virtually any appropriately detailed structure.

One skilled in the technology will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the technology are intended to be within the scope of the following claims.

What is claimed is:

1. A method for assisting a subscriber to perform self-care diagnostics and correction on a mobile device for troubleshooting and correcting the mobile device issue, the method comprising:
   accessing a self-care diagnostic and corrective application on the mobile device in response to an action from the subscriber;
   displaying a menu option upon accessing the self-care diagnostic and corrective application;
   communicating a selected menu option to a communication endpoint server;
   receiving diagnostic dynamic workflow in response to the selected menu, wherein the diagnostic dynamic workflow guides the subscriber through a series of tasks on the mobile device;
   executing the diagnostic dynamic workflow on the mobile device;
   transmitting a result of the executed diagnostic dynamic workflow to the communication endpoint server;
   receiving at least one corrective action script in response to the result; and
   translating the at least one corrective action script into a set of the mobile device specific get/set/exec commands.

2. The method according to claim 1, wherein the diagnostic dynamic workflow depends on sensitivity of the information that is managed.

3. The method according to claim 1, wherein the at least one corrective action script is a collection of get/set/exec commands.

4. The method according to claim 1, further comprising:
   connecting to the communication endpoint server in accordance with accessing the self-care diagnostic and corrective application.

5. The method according to claim 1, wherein usage information and statistics are accessible by the subscriber through the self-care diagnostic and corrective application.

6. The method according to claim 1, wherein diagnostic tools are provided upon accessing the self-care diagnostic and corrective application.

7. A method for assisting a subscriber to perform self-care diagnostics and correction on a mobile device for troubleshooting and correcting the mobile device issue, the method comprising:

receiving a selected menu option from a self-care diagnostic and corrective application accessed by the subscriber on the mobile device;

transmitting diagnostic dynamic workflow to the mobile device based on features supported by the mobile device and the selected menu option, wherein the diagnostic dynamic workflow assists in troubleshooting the mobile device;

determining a corrective action based on a result received from the mobile device, wherein the result is based on execution of the diagnostic dynamic workflow; and transmitting at least one corrective action script in accordance with the determined corrective action, wherein the at least one corrective action script results in the mobile device specific get/set/exec commands being applied on the mobile device, wherein the at least one corrective action script is a collection of get/set/exec commands.

8. The method according to claim 7, further comprising:
connecting to a client on the mobile device in accordance with accessing the self-care diagnostics and correction application on the mobile device for troubleshooting and correcting mobile device issue.

9. The method according to claim 7, wherein the diagnostic dynamic workflow is a series of tasks culminating in the at least one corrective action script.

10. The method according to claim 7, wherein the at least one corrective action script is generated by a scripting engine having a database and an execution engine for a collection of scripts.

11. A system for assisting a subscriber to perform self-care diagnostics and correction on a mobile device for troubleshooting and correcting the mobile device issue, comprising:
a communication endpoint server including at least a communication module;
the communication module configured to receive a menu option from a self-care diagnostic and corrective application accessed by the subscriber on the mobile device;
a workflow manager and the communication module configured to transmit diagnostic dynamic workflow to the mobile device based on features supported by the mobile device and the selected menu option, wherein the diagnostic dynamic workflow assists in troubleshooting the mobile device and is a series of tasks for guiding the subscriber to determine corrective action;
the workflow manager configured to determine the corrective action based on a result received from the mobile device, wherein the result is based on execution of the diagnostic dynamic workflow; and
the communication module configured to transmit at least one corrective action script to the mobile device, wherein the at least one corrective action script results in the mobile device specific get/set/exec commands being applied on the mobile device.

12. The system of claim 11, further comprising:
a scripting engine configured to generate the at least one corrective action script.

13. The system according to claim 12, further comprising:
the scripting engine configured to generate the at least one corrective action script from a collection of scripts.

14. The system according to claim 11, wherein the at least one corrective action script is a collection of get/set/exec commands.

15. The system according to claim 11, further comprising:
the communication module automatically connecting to a client in the mobile device in accordance with accessing the self-care diagnostic and correction application.

16. A mobile device, comprising:
a user interface configured to access a self-care diagnostic and corrective application on the mobile device in response to an action from a subscriber;
the mobile device configured to display a menu option upon accessing the self-care diagnostic and corrective application;
a communication module configured to communicate a selected menu option to a communication endpoint server;
the communication module configured to receive diagnostic dynamic workflow in response to the selected menu, wherein the mobile device and the communication module is configured to receive the diagnostic dynamic workflow to guide the subscriber through a series of tasks on the mobile device culminating in at least one corrective action script;
the mobile device configured to execute the diagnostic dynamic workflow on the mobile device;
the communication module configured to transmit a result of the executed diagnostic dynamic workflow to the communication endpoint server;
the communication module configured to receive the at least one corrective action script in response to the result; and
a command processing entity configured to translate the at least one corrective action script into at least one mobile device specific get/set/exec command.

* * * * *